United States Patent
Teng et al.

(10) Patent No.: US 12,470,723 B2
(45) Date of Patent: Nov. 11, 2025

(54) DEVICE AND METHOD FOR DECODING VIDEO DATA

(71) Applicant: SHARP KABUSHIKI KAISHA, Sakai (JP)

(72) Inventors: Chih-Yu Teng, Taipei (TW); Yu-Chiao Yang, Taipei (TW); Chih-Yuan Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/747,802

(22) Filed: Jun. 19, 2024

(65) Prior Publication Data

US 2025/0008112 A1    Jan. 2, 2025

Related U.S. Application Data

(60) Provisional application No. 63/524,340, filed on Jun. 30, 2023.

(51) Int. Cl.
*H04N 19/00*     (2014.01)
*H04N 19/159*    (2014.01)
*H04N 19/176*    (2014.01)

(52) U.S. Cl.
CPC ......... *H04N 19/159* (2014.11); *H04N 19/176* (2014.11)

(58) Field of Classification Search
CPC ..................................................... H04N 19/00
See application file for complete search history.

(56) References Cited

U.S. PATENT DOCUMENTS

| | | | |
|---|---|---|---|
| 2025/0030870 A1* | 1/2025 | Seregin | H04N 19/105 |
| 2025/0119528 A1* | 4/2025 | Lin | H04N 19/105 |
| 2025/0142087 A1* | 5/2025 | Wang | H04N 19/46 |

FOREIGN PATENT DOCUMENTS

| | | |
|---|---|---|
| WO | 2021244935 A1 | 12/2021 |
| WO | 2024153085 A1 | 7/2024 |

OTHER PUBLICATIONS

Zhang (BYTEDANCE) K et al: "EE2-1.6: Non-local cross-component prediction and cross-component merge mode", JVET-AD0188-v2, Joint Video Experts Team (JVET) of ITU-T SG 16 WP 3 and ISO/IEC JTC 1/SC 29, 30th Meeting, Antalya, TR, Apr. 21-28, 2023 (Apr. 21, 2023).

(Continued)

*Primary Examiner* — Maryam A Nasri
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method further determines an intra prediction mode from a plurality of intra default modes, determine a cross-component prediction (CCP) merge list of the block unit including a plurality of CCP merge candidates; and selecting one of the CCP merge candidates for the block unit to determine a prediction model of the selected CCP merge candidate. The method then predicts the block unit using the prediction model of the selected CCP merge candidate to generate a first prediction block, predicts the block unit based on the intra prediction mode to generate a second prediction block, and reconstructs the block unit based on the first prediction block and the second prediction block.

18 Claims, 5 Drawing Sheets

(56) References Cited

OTHER PUBLICATIONS

Adrian Browne et al., "Algorithm description for Versatile Video Coding and Test Model 20 (VTM20)", JVET-AD2002-v1, Joint Video Experts Team (JVET) of ITU-T SG 16 WP 3 and ISO/IEC JTC 1/SC 29, 30th Meeting, Antalya, TR, Apr. 21-28, 2023.

Series H: Audiovisual and Multimedia Systems, Infrastructure of audiovisual services—Coding of moving video, Versatile video coding, ITU-T H.266 (Apr. 2022).

Muhammed Coban et al., "Algorithm description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023.

\* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/524,340, filed on Jun. 30, 2023, entitled "Proposed Refinement Method for Cross-Component Prediction," the content of which is hereby incorporated herein fully by reference in its entirety for all purposes.

FIELD

The present disclosure generally relates to video coding, and more specifically, to techniques for predicting a block unit based on a prediction model and an intra prediction mode.

BACKGROUND

Cross-component prediction (CCP) mode is a chroma coding tool for video coding, in which, an encoder and/or a decoder may predict a chroma block of a current block based on a luma block of the current block by using a prediction model.

In addition, the encoder and/or the decoder may derive the prediction model of the chroma block based on other prediction models of other blocks reconstructed prior to reconstructing the current block. However, the prediction models of other blocks are not derived based on multiple neighboring samples neighboring the current block. Thus, the prediction model of the chroma block derived based on the prediction models of other blocks may be inadequate to predict all of multiple chroma samples in the chroma block.

Thus, different types of model refinement modes may be required for the encoder and/or the decoder to be able to precisely and efficiently predict and/or reconstruct the chroma block of the block unit.

SUMMARY

The present disclosure is directed to a device and method for predicting a block unit based on an intra prediction mode and a prediction model.

In a first aspect of the present disclosure, a method of decoding video data and an electronic device for performing the method are provided. The method includes receiving the video data; determining a block unit from a current frame included in the video data; determining an intra prediction mode from multiple intra default modes; determining a cross-component prediction (CCP) merge list of the block unit including a plurality of CCP merge candidates; selecting one of the plurality of CCP merge candidates for the block unit to determine a prediction model of the selected one of the plurality of CCP merge candidates; predicting the block unit using the prediction model of the selected one of the plurality of CCP merge candidates to generate a first prediction block; predicting the block unit based on the intra prediction mode to generate a second prediction block; and reconstructing the block unit based on the first prediction block and the second prediction block.

An implementation of the first aspect of the present disclosure further includes weightedly combining the first prediction block and the second prediction block to generate a predicted block, wherein reconstructing the block unit is further based on the predicted block.

In another implementation of the first aspect of the present disclosure, each of the multiple CCP merge candidates of the block unit has a candidate model, and the candidate model of the selected one of the multiple CCP merge candidates is the prediction model of the used for predicting the block unit to generate the first prediction block.

In another implementation of the first aspect of the present disclosure, the multiple CCP merge candidates of the block unit are selected from multiple CCP predefined candidates including multiple block-vector-based CCP merge candidates.

In another implementation of the first aspect of the present disclosure, the multiple CCP merge candidates of the block unit are selected from multiple CCP predefined candidates, and the multiple CCP predefined candidates include at least one of multiple spatial adjacent CCP merge candidates, multiple spatial non-adjacent CCP merge candidates, multiple history-based CCP merge candidates, multiple default CCP merge candidates, or multiple temporal CCP merge candidates.

In another implementation of the first aspect of the present disclosure, the prediction model of the selected one of the plurality of CCP merge candidates includes multiple model coefficients used for predicting a reference block corresponding to the selected one of the plurality of CCP merge candidates, and predicting the block unit using the prediction model of the selected one of the plurality of CCP merge candidates to generate the first prediction block is further based on the multiple model coefficients.

In another implementation of the first aspect of the present disclosure, the multiple intra default modes include a Planar mode, a DC mode, and multiple intra angular modes.

In another implementation of the first aspect of the present disclosure, the intra prediction mode of the block unit is a predefined one of the Planar mode, the DC mode, and the multiple intra angular modes.

In another implementation of the first aspect of the present disclosure, determining the intra prediction mode of the block unit from the multiple intra angular modes is based on a decoder-side intra mode derivation (DIMD) mode.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DETAILED DESCRIPTION

Figure 1:
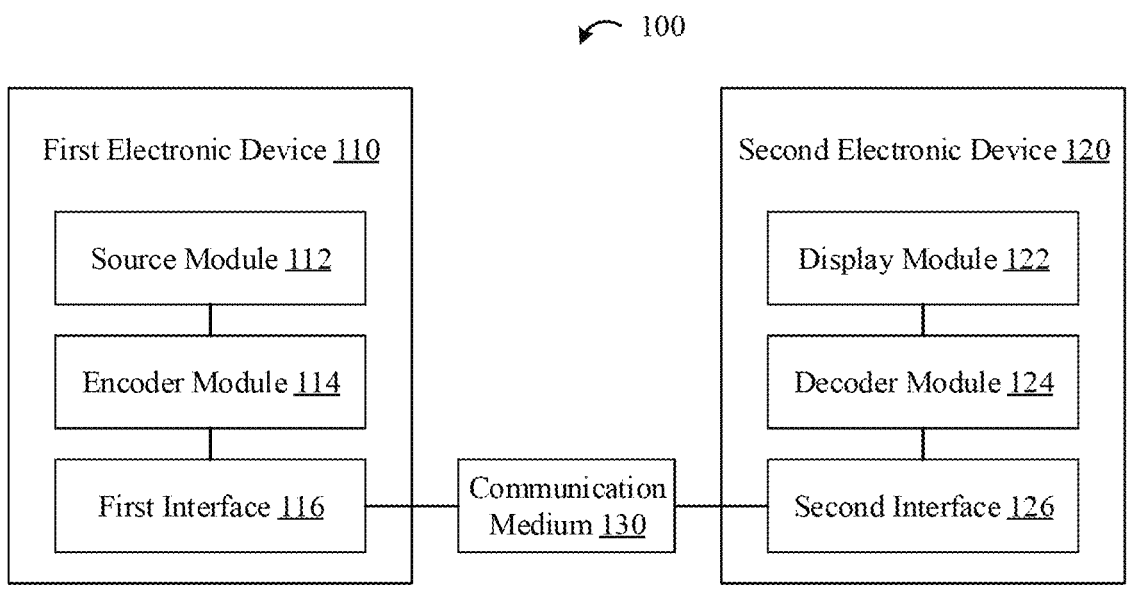
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
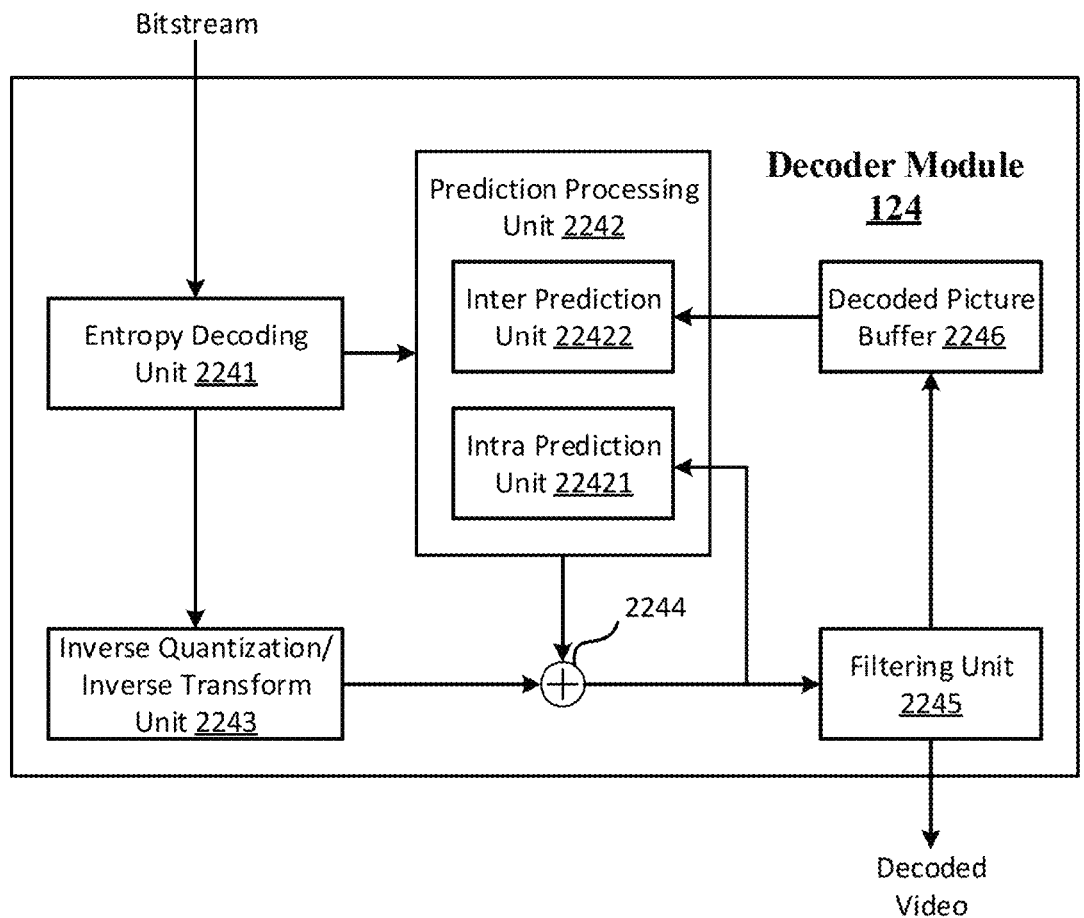
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
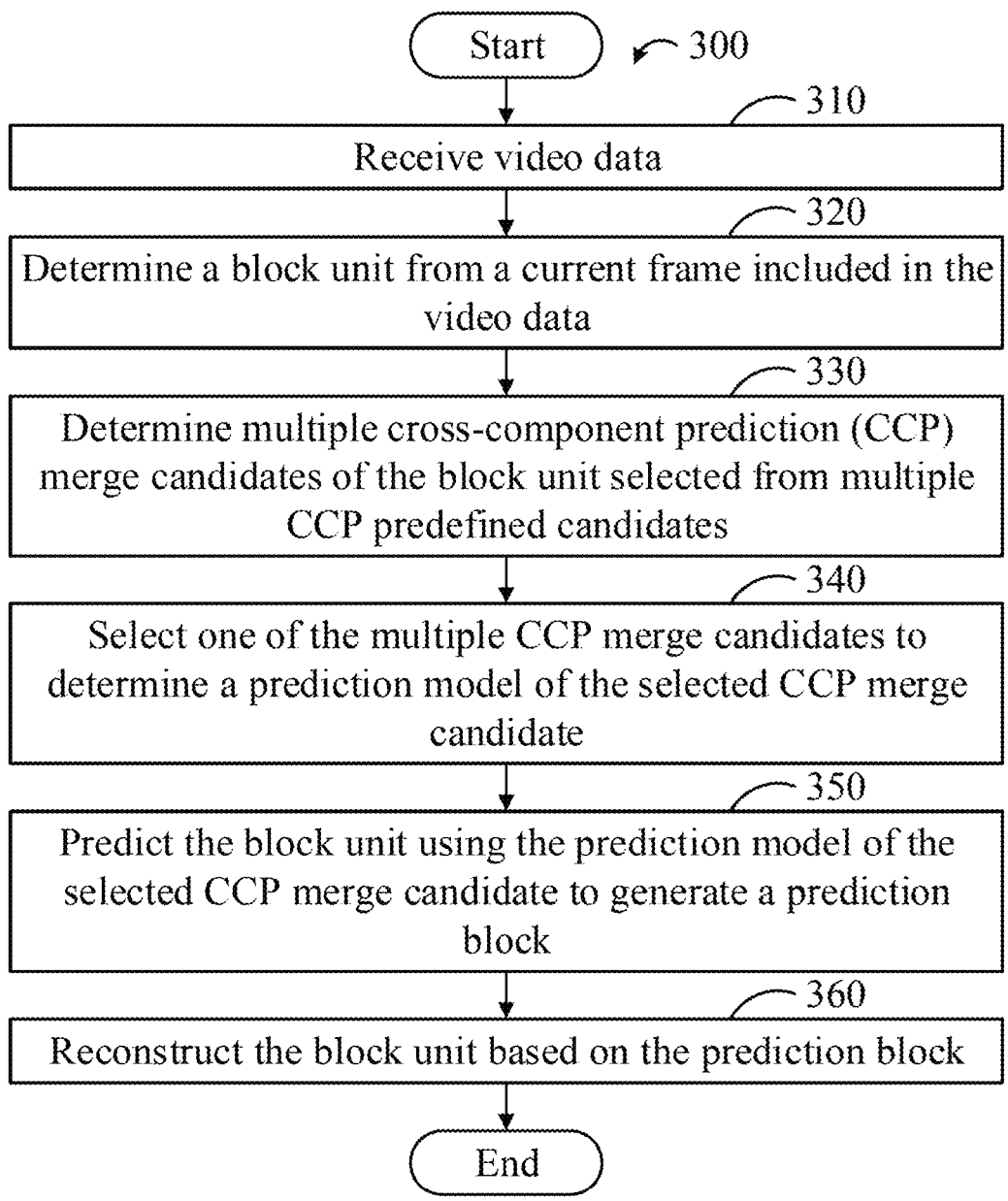
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of mechanisms of decoding the video data.

The method/process 300 may be performed by an electronic device using the configurations illustrated in FIGS. 1 and 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus may be different from what is illustrated. Additional blocks may be added or fewer blocks may be utilized without departing from the scope of the present disclosure.

At block 310, the method/process 300 may start by the decoder module 124 (e.g., as shown in FIG. 2) receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

At block 320, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). The size of the block unit may be Wb×Hb. In some implementations, each of the Wb and Hb may be positive integers (e.g., 4, 8, etc.) that may be equal to, or different from, each other.

At block 330, the decoder module 124 may determine multiple cross-component prediction (CCP) merge candidates of the block unit selected from multiple CCP predefined candidates. The CCP merge candidates of the block unit may be included in a CCP merge list of the block unit.

Each of the CCP merge candidates of the block unit may correspond to one of multiple CCP candidate blocks of the block unit, and each of the CCP candidate blocks may have a corresponding one of multiple CCP candidate models used to predict and/or reconstruct the corresponding one of the CCP candidate blocks. Thus, each of the CCP merge candidates of the block unit may have a corresponding one of the CCP candidate models. In some implementations, the CCP predefined candidates may include at least one of multiple spatial adjacent CCP merge candidates, multiple spatial non-adjacent CCP merge candidates, multiple history-based CCP merge candidates, multiple temporal CCP merge candidates, or multiple default CCP merge candidates. In some other implementations, the CCP predefined candidates may include at least one of the spatial adjacent CCP merge candidates, the spatial non-adjacent CCP merge candidates, the history-based CCP merge candidates, the temporal CCP merge candidates, multiple block-vector-based CCP merge candidates, or the default CCP merge candidates. Additional candidate types may be added or fewer candidate types may be utilized without departing from the scope of the present disclosure. When one of multiple CCP reference blocks determined based on one of the CCP predefined candidates is predicted using one of multiple cross-component model modes, the one of the CCP reference blocks may be selected as one of the CCP candidate blocks. In addition, a CCP prediction model of the one of the CCP reference blocks may be selected to be included in the CCP candidate models of the block unit to generate one of the CCP merge candidates included in the CCP merge list.

The CCP candidate models of the block unit may be the CCP prediction models used to predict and/or reconstruct a portion of the CCP reference blocks determined based on the CCP predefined candidates. The CCP prediction models may be determined using the cross-component model modes. The cross-component model modes may include at least one of multiple cross-component linear model (CCLM) prediction modes, multiple convolutional cross-component model (CCCM) prediction modes, and multiple gradient linear mode (GLM) prediction modes. The CCLM prediction modes may further include multiple single linear model (SLM) prediction modes and multiple multi-model linear model (MMLM) prediction modes. The CCCM prediction modes may further include multiple gradient and location CCCM (GL-CCCM) prediction modes, multiple non-down-sampled CCCM (NS-CCCM) prediction modes, and multiple multiple-down-sampled filters CCCM (MDF-CCCM) prediction modes. The GLM prediction modes may further include multiple luma sample with GLM (L-GLM) prediction modes.

The spatial adjacent CCP merge candidates may indicate multiple spatial adjacent CCP candidate blocks. Each of the spatial adjacent CCP candidate blocks may include at least one of multiple spatial adjacent CCP candidate samples. The spatial adjacent CCP candidate samples may be located, respectively, at one of multiple spatial adjacent CCP candidate positions. The spatial adjacent CCP candidate positions may include (x+Wb−1, y−1), (x−1, y+Hb−1), (x+Wb, y−1), (x−1, y+Hb), and (x−1, y−1), when a top-left corner of the block unit is located at a top-left position (x, y). When one of the spatial adjacent CCP candidate blocks is predicted using one of the cross-component model modes based on a CCP prediction model, the one of the spatial adjacent CCP candidate blocks may be selected as one of the CCP candidate blocks. In addition, the CCP prediction model of the one of the spatial adjacent CCP candidate blocks may be selected to be included in the CCP candidate models of the block unit to generate one of the CCP merge candidates in the CCP merge list.

The spatial non-adjacent CCP merge candidates may indicate multiple spatial non-adjacent CCP candidate blocks. Each of the spatial non-adjacent CCP candidate blocks may include at least one of multiple spatial non-adjacent CCP candidate samples. The spatial non-adjacent CCP candidate samples may be located, respectively, at one of multiple spatial non-adjacent CCP candidate positions. The spatial non-adjacent CCP candidate positions may include at least one of multiple spatial non-adjacent positions in an inter merge mode of a video coding standard. When one of the spatial non-adjacent CCP candidate blocks is predicted using one of the cross-component model modes based on a CCP prediction model, the one of the spatial non-adjacent CCP candidate blocks may be selected as one of the CCP candidate blocks. In addition, the CCP prediction model of the one of the spatial non-adjacent CCP candidate blocks may be selected to be included in the CCP candidate models of the block unit to generate one of the CCP merge candidates in the CCP merge list.

Multiple previous blocks reconstructed prior to reconstructing the block unit may be reconstructed based on multiple reconstruction schemes. When one of the previous blocks is reconstructed using one of the cross-component model modes based on a CCP prediction model, the CCP prediction model of the one of the previous blocks may be stored in a CCP model table on a first-in-first-out (FIFO) basis. The size of the CCP model table may be equal to Nt. In some implementations, the number Nt may be a positive integer, such as 6 or 12. In some implementations, the CCP model table may be reset at a beginning of each CTU row. When the block unit is being reconstructed, the CCP prediction models stored in the CCP model table may be selected to be included in the CCP candidate models of the block unit to generate the CCP merge candidates in the CCP merge list.

The temporal CCP merge candidates may indicate multiple temporal CCP candidate blocks. Each of the temporal CCP candidate blocks may include at least one of multiple temporal CCP candidate samples. The temporal CCP candidate samples may be located, respectively, at one of multiple temporal CCP candidate positions. The temporal CCP candidate positions may include multiple predefined locations of a reference picture in multiple reference picture lists. The reference picture lists may include a first reference picture list L0 and a second reference picture list L1. In some implementations, the temporal CCP candidate positions may include identical multiple temporal positions in the inter merge mode of the video coding standard. When one of the temporal CCP candidate blocks is predicted using one of the cross-component model modes based on a CCP prediction model, the one of the temporal CCP candidate blocks may be selected as one of the CCP candidate blocks. In addition, the CCP prediction model of the one of the temporal CCP candidate blocks may be selected to be included in the CCP candidate models of the block unit to generate one of the CCP merge candidates in the CCP merge list. In some implementations, the CCP prediction model of the temporal CCP candidate block corresponding to the first reference picture list L0 may be selected prior to selecting the CCP prediction model of the temporal CCP candidate block corresponding to the second reference picture list L1. Thus, with reference to FIGS. 1 and 2, after the decoder module 124 finishes checking whether the temporal CCP candidate blocks corresponding to the first reference picture list L0 have the CCP prediction model, the decoder module 124 may start to check the temporal CCP candidate blocks corresponding to the second reference picture list L1.

The block-vector-based CCP merge candidates may indicate multiple block-vector-based CCP candidate blocks. Each of the block-vector-based CCP candidate blocks may be indicated by a block candidate vector.

In some implementations, when luma samples of the block unit are reconstructed based on a luma block vector in an intra block copy (IBC) prediction mode of the video coding standard, the luma block vector may be used to derive the block candidate vector based on a scaling factor. The scaling factor may be determined based on a video format. In some implementations, if the video format is YUV444, the scaling factor may be equal to 1. If the video format is YUV422, the scaling factor may further include a width scaling factor equal to 2 and a height scaling factor equal to 1. If the video format is YUV420, the scaling factor may be equal to 2. Thus, the luma block vector of the block unit may be used to derive one of the block-vector-based CCP merge candidates.

In some implementations, when the luma samples of the block unit are reconstructed based on at least one luma intra template matching prediction (IntraTMP) candidate block in an IntraTMP prediction mode of the video coding standard, the at least one luma IntraTMP candidate block may be used to derive at least one luma IntraTMP block vector. In addition, the at least one luma IntraTMP block vector may be used to derive at least one block candidate vector based on the scaling factor. Thus, the at least one luma IntraTMP candidate block may be used to determine at least one of the block-vector-based CCP merge candidates.

With reference to FIGS. 1 and 2, in some implementations, the decoder module 124 may determine a first chroma template region of the block unit, and may further search multiple chroma candidate blocks within a search range in the current frame. The decoder module 124 may further determine a chroma reference region for each of the chroma candidate blocks. The decoder module 124 may compare each of the chroma reference regions of the chroma candidate blocks with the first chroma template region of the block unit. The size and the shape of the chroma reference regions of the chroma candidate blocks may be identical to those of the first chroma template region of the block unit.

The decoder module 124 may determine multiple template cost values by comparing each of the chroma reference regions of the chroma candidate blocks with the first chroma template region of the block unit. Each of the template cost values may be determined by calculating a difference between the block template region and a corresponding one of the chroma reference regions. The decoder module 124 may then select at least one of the chroma candidate blocks based on the template cost values, and may further determine at least one of the block-vector-based CCP merge candidates based on the at least one selected chroma candidate block.

Since the first chroma template region and the chroma reference regions are reconstructed prior to reconstructing the block unit, the decoder module 124 may directly receive multiple reconstructed results of the first chroma template region and the chroma reference regions. The differences between the block template region and each of the chroma reference regions may be calculated based on a Mean Squared Error (MSE) calculation. In addition, the differences between the block template region and each of the chroma reference regions may be calculated based on a Sum of Absolute Difference (SAD) calculation. In some implementations, the differences between the block template region and each of the chroma reference regions may be calculated based on a Sum of Absolute Transformed Difference (SATD) calculation. In some implementations, the differences between the block template region and each of the chroma reference regions may be calculated based on a mean-removed sum of absolute difference (MR-SAD) calculation.

When one of the block-vector-based CCP candidate blocks is predicted using one of the cross-component model modes based on a CCP prediction model, the one of the block-vector-based CCP candidate blocks may be selected as one of the CCP candidate blocks. In addition, the CCP prediction model of the one of the block-vector-based CCP candidate blocks may be selected to be included in the CCP candidate models of the block unit to generate one of the CCP merge candidates in the CCP merge list.

The number of the CCP merge candidates may be equal to Nc. In some implementations, the number Nc may be a positive integer, such as 6 or 12. When the decoder module 124 checks whether the spatial adjacent CCP merge candidates, the spatial non-adjacent CCP merge candidates, the history-based CCP merge candidates, the temporal CCP merge candidates, and the block-vector-based CCP merge candidates are allowable to add into the CCP merge candidates of the block unit, the decoder module 124 may also check whether the number of the added CCP merge candidates of the block unit is equal to the number Nc. When the number of the added CCP merge candidates of the block unit is equal to the number Nc, the decoder module 124 may bypass checking and stop adding the CCP predefined candidates into the CCP merge candidates.

However, in some implementations, after the decoder module 124 finishes checking whether the spatial adjacent CCP merge candidates, the spatial non-adjacent CCP merge candidates, the history-based CCP merge candidates, the temporal CCP merge candidates, and the block-vector-based CCP merge candidates are allowable to add into the CCP merge candidates of the block unit, the number of the added CCP merge candidates of the block unit may be still less than the number Nc. Thus, the decoder module 124 may add at least one of the default CCP merge candidates into the CCP merge candidates of the block unit. In some implementations, each of the default CCP merge candidates may include a coefficient set. Each of the coefficient sets may include a scaling coefficient and an offset coefficient. The scaling coefficient in each coefficient set may be selected from multiple scaling candidates, such as 0, 1, −1, 2, −2, 3, −3, 4, −4, 5, −5, or 6. The offset coefficient in each coefficient set may be selected from multiple offset candidate, such as 0, 1, −1, 2, −2, or 3. In some implementations, when the CCP candidate block indicated by the first one of the CCP merge candidates is reconstructed based on the SLM, the scaling candidates and the offset candidates may be derived based on the CCP candidate model of the first one of the CCP merge candidates.

Referring back to FIG. 3, at block 340, the decoder module 124 may select one of the multiple CCP merge candidates to determine a prediction model of the selected CCP merge candidate.

With reference to FIGS. 1 and 2, in some implementations, the decoder module 124 may determine a merge index from the bitstream. For example, the decoder module 124 may parse the merge index from the bitstream. The merge index may indicate one of the CCP merge candidates to determine the prediction model of the selected CCP merge candidate. Since each of the CCP candidate blocks corresponding to each of the CCP merge candidates has a corresponding one of the CCP candidate models, the selected CCP merge candidate may have a specific one of the CCP candidate models as the prediction model Thus, the prediction model may be inherited from the specific CCP candidate model used to predict a reference block corresponding to the selected CCP merge candidate and determined from the CCP candidate blocks.

In some implementations, the decoder module 124 may determine the selected CCP merge candidate without parsing any index from the bitstream. For example, the decoder module 124 may determine a second chroma template region of the block unit and determine a chroma reference region for each of the CCP candidate blocks. The decoder module 124 may then determine multiple template cost values by comparing each of the chroma reference regions of the CCP candidate blocks with the second chroma template region of the block unit. Thus, the decoder module 124 may determine the selected CCP merge candidate based on the template cost values, and further determine the CCP candidate model of the selected CCP merge candidate as the prediction model. It should be noted that the scheme for determining the selected CCP merge candidate may be changed without departing from the scope of the present disclosure. The size and the shape of the chroma reference regions of the CCP candidate blocks may be identical to those of the second chroma template region of the block unit. In some implementations, the second chroma template region may be identical to the first chroma template region. In some other implementations, the second chroma template region may be different from the first chroma template region.

Referring back to FIG. 3, at block 350, the decoder module 124 may predict the block unit using the prediction model of the selected CCP merge candidate to generate a prediction block.

In some implementations, the block unit may inherit the prediction model of the reference block corresponding to the selected CCP merge candidate, which may result in the prediction model of the block unit being identical to the prediction model of the reference block. Thus, with reference to FIGS. 1 and 2, the decoder module 124 may predict the block unit using the prediction model of the block unit to generate the prediction block.

The luma samples of the block unit may be reconstructed prior to reconstructing the chroma samples of the block unit. Thus, the decoder model 124 may determine the reconstructed luma samples of the block unit and may predict the chroma samples of the block unit based on the reconstructed luma samples by using the prediction model of the block unit to generate the prediction block.

In some implementations, when the prediction model of the reference block does not include any of the multiple model refinement modes, the prediction model of the block unit may not include the model refinement modes. In some implementations, when the prediction model of the reference block includes one of the model refinement modes, the model refinement mode of the reference block may not be inherited by the block unit. Thus, the prediction model of the block unit may not include any of the model refinement modes. In some implementations, when the prediction model of the reference block includes one of the model refinement modes, the model refinement mode of the reference block may be inherited by the block unit. Thus, the prediction model of the block unit may also include the model refinement mode of the reference block. In some implementations, the bitstream may include a refinement inherited flag for determining whether the model refinement mode of the reference block is inherited by the block unit when the prediction model of the reference block includes one of the model refinement modes.

In some other implementations, the block unit may inherit the prediction model of the reference block, which may result in the prediction model of the reference block being an inherited model of the block unit. The inherited model of the block unit may be further refined based on one of the model refinement modes to generate the prediction model of the block unit. The decoder module 124 may then predict the block unit using the prediction model of the block unit to generate the prediction block. In yet other implementations, the inherited model of the block unit may include the model refinement mode of the reference block when the prediction model of the reference block includes one of the model refinement modes. In addition, the inherited model of the block unit may be further refined based on one of the model refinement modes to generate the prediction model of the block unit. In other words, the prediction model of the block unit may be generated by refining twice based on the model refinement modes.

The model refinement modes may include a CCP merge offset refinement mode, a CCP merge slope refinement mode, a CCP merge slope and offset refinement mode, and a CCP merge coefficient refinement mode.

In the CCP merge offset refinement mode, the decoder module 124 may directly add at least one offset value into the inherited model of the block unit to generate the prediction model of the block unit. For example, when the inherited model is InherChroma(i, j), the prediction model PredChroma(i, j) may be equal to InherChroma(i, j)+offset. In some implementations, the prediction model PredChroma (i, j) may be used to derive a predicted value of a block sample located at a sample position (i, j). The at least one offset value may be derived based on multiple scheme. It should be noted that the derivation scheme of the offset value may be changed without departing from the scope of the present disclosure. When the inherited model InherChroma(i, j) includes only one cross-component model, such as one cross-component model generated by the SLM prediction mode of the CCLM prediction modes, the at least one offset value may include only one offset value. When the inherited model InherChroma(i, j) includes more than one cross-component model, such as two cross-component models generated by the MMLM prediction mode of the CCLM prediction modes, the at least one offset value may include more than one offset set, such as two offset values. When the number of the at least one offset value is greater than one, each of the offset values may be independently derived based on a division scheme of the more than one cross-component model.

In some implementations, the decoder module 124 may determine a third chroma template region and a luma template region. The third chroma template region may neighbor a chroma block of the block unit, and the luma template region may neighbor a luma block of the block unit. The chroma block of the block unit may include the chroma samples of the block unit, and the luma block of the block unit may include the luma samples of the block unit. In some implementations, the third chroma template region may be identical to at least one of the first chroma template region and the second chroma template region. In some other implementations, the third chroma template region may be different from the first chroma template region and the second chroma template region.

The third chroma template region may include at least one of a left chroma region, an above chroma region, or an above-left chroma region. The chroma left region may be a first area located at a left side of the block unit, the above chroma region may be a second area located above the block unit, and the above-left chroma region may be a third area located at a top-left side of the block unit. The left chroma region, the above chroma region, and the above-left chroma region may be reconstructed prior to reconstructing the block unit. In some implementations, the size of the third chroma template region may be determined based on the size of the block unit. The width of the above chroma region may be equal to the width of the block unit, and the height of the above chroma region may be equal to a number L. The height of the left chroma region may be equal to the height of the block unit, and the width of the left chroma region may be equal to the number L. The width and height of the above-left chroma region may be equal to the number L. In some implementations, the number L may be a positive integer, such as 1 or 2. The size of the luma template region may be determined based on the size of the chroma template region and the scaling factor. The scaling factor may be determined based on the video format.

Since the third chroma template region and the luma template region are reconstructed prior to reconstructing the block unit, the decoder module 124 may directly receive multiple reconstructed results of the third chroma template region and the luma template region. The decoder module 124 may then predict the third chroma template region based on the reconstructed results of the luma template region by using the inherited model InherChroma(i, j) to generate multiple predicted results of the third chroma template region. In addition, the decoder module 124 may compare the reconstructed results of the third chroma template region with the predicted results of the third chroma template region to generate multiple template difference values. The decoder module 124 may determine the offset value based on the template difference values. In some implementations, the offset value may be equal to an average At of the template difference values. In some implementations, the offset value may be an integer generated by rounding the average At of the template difference values.

In some other implementations, the decoder module 124 may also determine the third chroma template region and the luma template region. In addition, the offset value may be selected from multiple offset candidates based on the third chroma template region and the luma template region. In some implementations, absolute values of the offset candidates may be equal to or less than an offset threshold To. Thus, the offset candidates may be equal to −To, −To+1, −To+2, ..., −1, 0, 1, ..., To−1, and To. The offset threshold To may be a positive integer, such as 5. In some implementations, absolute values of multiple differences between the offset candidates and the average At of the template difference values may be equal to or less than the offset threshold To. Thus, the offset candidates may be equal to Av−To, Av−To+1, Av−To+2, ..., −1, 0, 1, ..., Av+To−1, and Av+To.

The decoder module 124 may add each of the offset candidates into the inherited model InherChroma(i, j) to generate, respectively, a corresponding one of multiple offset models. The decoder module 124 may then predict the third chroma template region based on the reconstructed results of the luma template region by using the offset models to generate multiple predicted results of the third chroma template region for each of the offset models. In addition, the decoder module 124 may generate multiple template cost values by comparing the reconstructed results of the third chroma template region with the predicted results of the third chroma template region for each of the offset models. Since each of the offset models may be used to generate a set of the predicted results of the third chroma template region, each of the offset models may be used to calculate a template cost value by the corresponding set of the predicted results of the third chroma template region. The decoder module 124 may select the offset value from the offset candidates based on the template cost values. For example, when the minimum of the template cost values is calculated based on a specific one of the offset models generated by a specific one of the offset candidates, the specific one of the offset candidates may be set as the offset value.

In yet other implementations, the decoder module 124 may directly receive the offset value from the bitstream. For example, in some implementations, the encoder module 114 may derive the offset value and then encode the offset value into the bitstream. The encoder module 114 may directly predict the block unit by using the inherited model InherChroma(i, j) to generate multiple chroma predicted results of the block unit, and then compare the chroma predicted results of the block unit with original chroma samples of the block unit. The offset value may be derived by the encoder module 114 based on the comparison between the chroma predicted results of the block unit and the original chroma samples of the block unit and then encoded into the bitstream. In some implementations, the offset value may be equal to an average Ab of multiple block difference values between the chroma predicted results of the block unit and the original chroma samples of the block unit. In some implementations, the offset value may be an integer generated by rounding the average Ab of the block difference values. In some other implementations, the encoder module 114 may select the offset value from the offset candidates. The encoder module 114 may add each of the offset candidates into the inherited model InherChroma(i, j) to generate, respectively, a corresponding one of the offset models. The encoder module 114 may predict the chroma block of the block unit based on the reconstructed results of the luma block of the block unit by using the offset models to generate multiple predicted results of the chroma block for each of the offset models. The encoder module 114 may generate multiple rate-distortion (RD) cost values by comparing the predicted results of the chroma block for each of the offset models with the original chroma samples of the block unit. Thus, the encoder module 114 may select the offset value from the offset candidates based on the RD cost values and encode an offset index indicating the offset value into the bitstream for the decoder module 124. For example, when the minimum of the RD cost values is calculated based on a specific one of the offset models generated by a specific one of the offset candidates, the specific one of the offset candidates may be set as the offset value.

In the CCP merge slope refinement mode, the decoder module 124 may determine at least one adjustment value when the inherited model InherChroma(i, j) of the block unit is generated by the CCLM prediction modes. For example, when the inherited model InherChroma(i, j) is equal to $(\alpha \cdot rec_L) >> k + \beta$, the prediction model may be equal to $(\alpha' \cdot rec_L) >> k + \beta'$. The term $rec_L$ may be reconstructed luma samples of the block unit. The coefficients $\alpha$ and $\beta$ may be linear model coefficients of the inherited model InherChroma(i, j), and k may be a shift value of the inherited model InherChroma(i, j). The coefficient $\alpha'$ may be a linear model coefficient of the prediction model equal to $\alpha + u$, and the coefficient $\beta'$ may be another linear model coefficient of the prediction model equal to $\beta - u * y_r$. The value u may be the slope adjustment parameter and the value $y_r$ may be an average value of the reconstructed results of the luma template region. When the inherited model InherChroma(i, j) is generated by the SLM prediction mode of the CCLM prediction modes, the at least one adjustment value may include only one parameter u. When the inherited model InherChroma(i, j) is generated by the MMLM prediction mode of the CCLM prediction modes, the at least one adjustment value may include more than one adjustment values, such as parameters $u_1$ and $u_2$. When the number of the at least one adjustment value is greater than one, each of the adjustment values may be independently derived based on a division scheme of the MMLM prediction mode.

The parameter u may be selected from multiple adjustment candidates based on the third chroma template region and the luma template region. In some implementations, absolute values of the adjustment candidates may be equal to or less than an adjustment threshold Ta. Thus, the adjustment candidates may be equal to −Ta, −Ta+1, −Ta+2, ..., ×1, 0, 1, ..., Ta−1, and Ta. The adjustment threshold Ta may be a positive integer, such as 5.

The decoder module 124 may add each of the adjustment candidates into the inherited model InherChroma(i, j) to generate, respectively, a corresponding one of multiple adjustment models. The decoder module 124 may then predict the third chroma template region based on the reconstructed results of the luma template region by using the adjustment models to generate multiple predicted results of the third chroma template region for each of the adjustment models. In addition, the decoder module 124 may generate multiple template cost values by comparing the reconstructed results of the third chroma template region with the predicted results of the third chroma template region for each of the adjustment models. Since each of the adjustment models may be used to generate a set of the predicted results of the third chroma template region, each of the adjustment models may be used to calculate a template cost value by the corresponding set of the predicted results of the third chroma template region. The decoder module 124 may select the parameter u from the adjustment candidates based on the template cost values. For example, when the minimum of the template cost values is calculated based on a specific one of the adjustment models generated by a specific one of the adjustment candidates, the specific one of the adjustment candidates may be set as the parameter u.

In some other implementations, the encoder module 114 may select at least one parameter u from the adjustment candidates. The encoder module 114 may add each of the adjustment candidates into the inherited model InherChroma (i, j) to generate, respectively, a corresponding one of the adjustment models. The encoder module 114 may predict the chroma block of the block unit based on the reconstructed results of the luma block of the block unit by using the adjustment models to generate multiple predicted results of the chroma block for each of the adjustment models. The encoder module 114 may generate multiple RD cost values by comparing the predicted results of the chroma block for each of the adjustment models with the original chroma samples of the block unit. Thus, the encoder module 114 may select the at least one parameter u from the adjustment candidates based on the RD cost values and encode at least one parameter index indicating the at least one parameter u into the bitstream for the decoder module 124. For example, when the minimum of the RD cost values is calculated based on a specific one of the adjustment models generated by a specific one of the adjustment candidates, the specific one of the adjustment candidates may be set as the parameter u.

In the CCP merge slope and offset refinement mode, in some implementations, the decoder module 124 may first add at least one offset value by using the CCP merge offset refinement mode, and then add at least one parameter u by using the CCP merge slope refinement mode. In some implementations, the decoder module 124 may first add at least one parameter u by using the CCP merge slope refinement mode, and then add at least one offset value by using the CCP merge offset refinement mode.

In the CCP merge coefficient refinement mode, each of multiple refinement values may be added, respectively, into a corresponding one of multiple model coefficients in the inherited model InherChroma(i, j). For example, when the inherited model InherChroma(i, j) includes five model coefficients $C_0$, $C_1$, $C_2$, $C_3$, and $C_4$, the prediction model may also include five refinement values $R_0$, $R_1$, $R_2$, $R_3$, and $R_4$. Each of the five refinement values $R_0$, $R_1$, $R_2$, $R_3$, and $R_4$ may be added into a corresponding one of the five model coefficients $C_0$, $C_1$, $C_2$, $C_3$, and $C_4$ to generate multiple refined values $C_0+R_0$, $C_1+R_1$, $C_2+R_2$, $C_3+R_3$, and $C_4+R_4$.

The decoder module 124 may directly receive the refinement values from the bitstream. For example, the encoder module 114 may derive the refinement values and then encode the refinement values into the bitstream. The encoder module 114 may derive an encoder model based on the reconstructed luma results of the block unit and the original chroma samples of the block unit. The cross-component model mode of the encoder model may be identical to the cross-component model mode of the inherited model InherChroma(i, j). For example, if the inherited model InherChroma(i, j) is generated by the SLM prediction mode, the encoder model may also be generated by the SLM prediction mode. Thus, the linear model coefficients of the encoder model may be derived based on a difference minimization process. The difference minimization process may minimize a difference between reconstructed chroma results of the block unit and the original chroma samples of the block unit. The difference minimization process may be used Least Mean Square (LMS) algorithm to derive the model coefficients of the SLM prediction mode. The decoder module 124 may compare the model coefficients of the encoder model with the model coefficients of the inherited model InherChroma(i, j) to generate the refinement values. For example, when the inherited model InherChroma(i, j) includes four model coefficients $C_0$, $C_1$, $C_2$, and $C_3$, the encoder model may also include four model coefficients $E_0$, $E_1$, $E_2$, and $E_3$. The refinement values may be equal, respectively, to $E_0-R_0$, $E_1-R_1$, $E_2-R_2$, and $E_3-R_3$. Thus, the refinement values may be derived by the encoder module 114 based on the reconstructed luma results of the block unit and the original chroma samples of the block unit and then encoded into the bitstream.

The prediction model of the reference block may include multiple model coefficients of the reference block. Since the inherited model of the block unit may be identical to the prediction model of the reference block, the inherited model of the block unit may also include the model coefficients of the reference block. In some implementations, when the inherited model of the block unit is not further refined, the prediction model of the block unit identical to the prediction model of the reference block may also include the model coefficients of the reference block. Thus, the decoder module 124 may predict the block unit using the prediction model of the reference block to generate the prediction block based on the model coefficients of the reference block. In some implementations, when the inherited model of the block unit is further refined to generate the prediction model of the block unit, the prediction model of the block unit different from the prediction model of the reference block may be derived based on the model coefficients of the reference block. Thus, the decoder module 124 may predict the block unit using the prediction model of the block unit, which is derived based on the prediction model of the reference block, to generate the prediction block based on the model coefficients of the block unit, which are derived based on the model coefficients of the reference block.

Referring back to FIG. 3, at block 360, the decoder module 124 may reconstruct the block unit based on the prediction block.

With reference to FIGS. 1 and 2, the decoder module 124 may reconstruct the block unit based on the prediction block. The decoder module 124 may determine multiple residual components from the bitstream for the block unit and add the residual components into the prediction block to reconstruct the block unit. The decoder module 124 may reconstruct all of the other block units in the image frame for reconstructing the image frame and the video. The method/process 300 may then end.

Figure 4:
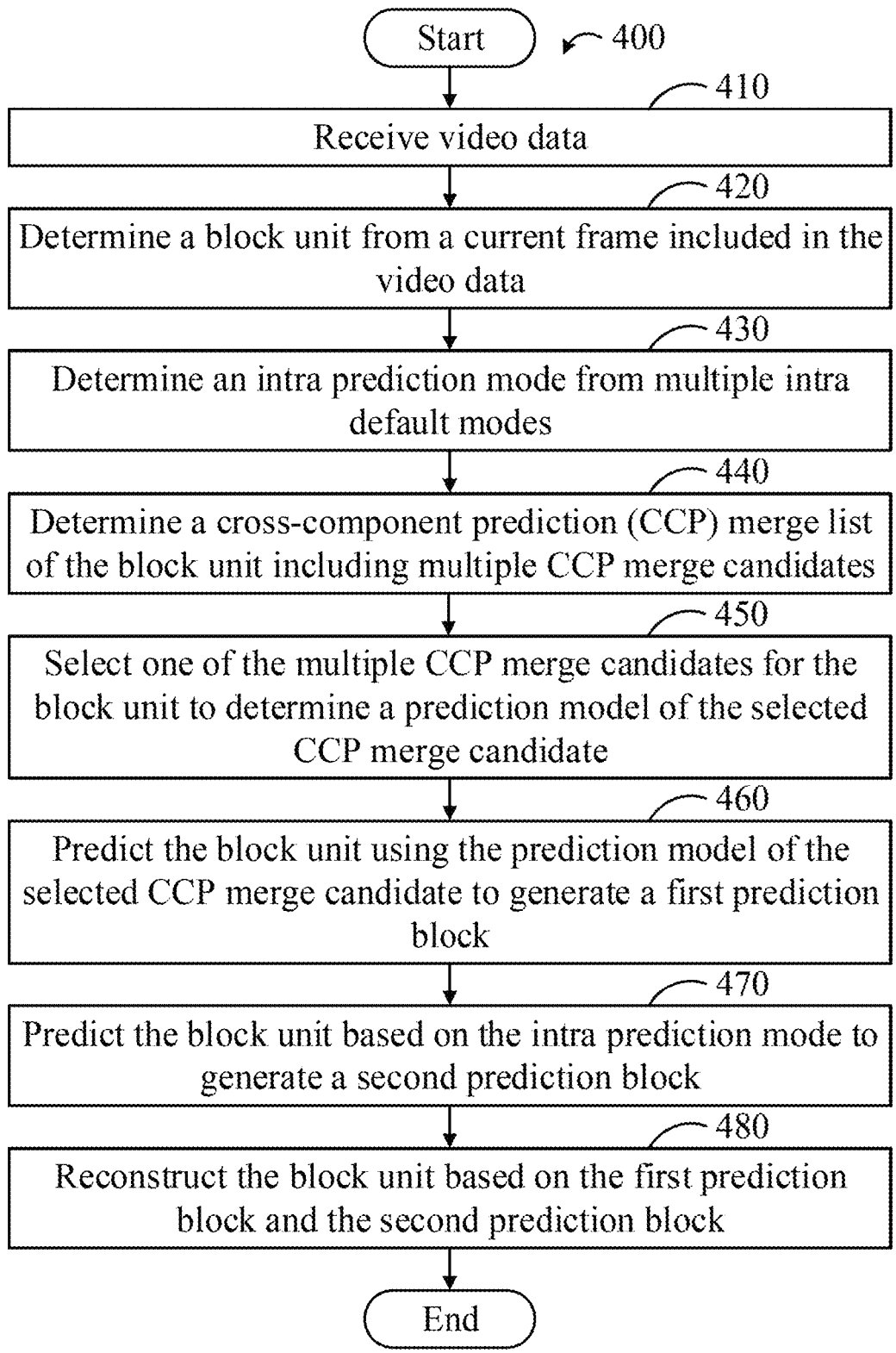
FIG. 4 is a flowchart illustrating a method/process for decoding and/or encoding video data by an electronic device, in accordance with one or more example implementations of this disclosure.

FIG. 4 is a flowchart illustrating a method/process 400 for decoding and/or encoding video data by an electronic device, in accordance with one or more example implementations of this disclosure. The method/process 400 is an example implementation, as there may be a variety of mechanisms of decoding the video data.

The method/process 400 may be performed by an electronic device using the configurations illustrated in FIGS. 1 and 2, where various elements of these figures may be referenced to describe the method/process 400. Each block illustrated in FIG. 4 may represent one or more processes, methods, or subroutines performed by an electronic device.

The order in which the blocks appear in FIG. 4 is for illustration only, and may not be construed to limit the scope of the present disclosure, thus may be different from what is illustrated. Additional blocks may be added or fewer blocks may be utilized without departing from the scope of the present disclosure.

At block 410, the method/process 400 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

At block 420, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to partition indications in the bitstream. For example, the decoder module 124 may divide the current frame to generate multiple CTUs, and further divide a current CTU included in the CTUs to generate multiple divided blocks and to determine the block unit from the divided blocks, according to the partition indications (e.g., based on any video coding standard). The size of the block unit may be Wb×Hb. In some implementations, each of the Wb and Hb may be positive integers (e.g., 4, 8, etc.) that may be equal to, or different from, each other.

At block 430, the decoder module 124 may determine an intra prediction mode from multiple intra default modes.

The intra default modes may include a Planar mode, a DC mode, and multiple intra angular modes. The number of the intra angular modes may be equal to the number Na. In some implementations, the number Na may be determined based on a video coding standard. Thus, the number Na may be a positive integer, such as 33 or 65.

In some implementations, with reference to FIGS. 1 and 2, the decoder module 124 may select the intra prediction mode from the intra default modes based on an intra mode index. The intra mode index may be parsed from the bitstream. In some implementations, the intra prediction mode may be a predefined one of the intra default modes. Thus, the decoder module 124 may determine the predefined one of the Planar mode, the DC mode, and the intra angular modes without parsing the intra mode index from the bitstream. For example, the predefined one of the intra default modes may be the Planar mode.

In some implementations, the intra prediction mode may be selected from the intra angular modes of the intra default modes by using a decoder-side intra mode derivation (DIMD) mode. The intra prediction mode selected using the DIMD mode may be derived by calculating a histogram of gradient based on multiple chroma samples neighboring the block unit and multiple luma samples neighboring a corresponding luma block.

At block 440, the decoder module 124 may determine a cross-component prediction (CCP) merge list of the block unit including multiple CCP merge candidates.

With reference to FIGS. 1 and 2, the decoder module 124 may determine multiple CCP merge candidates of the block unit selected from multiple CCP predefined candidates. Each of the CCP merge candidates of the block unit may correspond to one of multiple CCP candidate blocks of the block unit, and each of the CCP candidate blocks may have a corresponding one of multiple CCP candidate models used to predict and/or reconstruct the corresponding one of the CCP candidate blocks. Thus, each of the CCP merge candidates of the block unit may have a corresponding one of the CCP candidate models. In some implementations, the CCP predefined candidates may include at least one of multiple spatial adjacent CCP merge candidates, multiple spatial non-adjacent CCP merge candidates, multiple history-based CCP merge candidates, multiple temporal CCP merge candidates, or multiple default CCP merge candidates. In some other implementations, the CCP predefined candidates may include at least one of the spatial adjacent CCP merge candidates, the spatial non-adjacent CCP merge candidates, the history-based CCP merge candidates, the temporal CCP merge candidates, multiple block-vector-based CCP merge candidates, or the default CCP merge candidates. Additional candidate types may be added or fewer candidate types may be utilized without departing from the scope of the present disclosure. The CCP predefined candidates in the method/process 400 may be identical to those in the method/process 300.

When one of multiple CCP reference blocks determined based on one of the CCP predefined candidates is predicted using one of multiple cross-component model modes, the one of the CCP reference blocks may be selected as one of the CCP candidate blocks. In addition, a CCP prediction model of the one of the CCP reference blocks may be selected to be included in the CCP candidate models of the block unit to generate one of the CCP merge candidates included in the CCP merge list. The selection of the CCP merge candidates from the CCP predefined candidates in the method/process 400 may be identical to that in the method/process 300.

The CCP candidate models of the block unit may be the CCP prediction models used to predict and/or reconstruct a part of the CCP reference blocks determined based on the CCP predefined candidates. The CCP prediction models may be determined using the cross-component model modes. The cross-component model modes may include at least one of multiple CCLM prediction modes, multiple CCCM prediction modes, and multiple GLM prediction modes. The CCLM prediction modes may further include multiple SLM prediction modes and multiple MMLM prediction modes. The CCCM prediction modes may further include multiple GL-CCCM prediction modes, multiple NS-CCCM prediction modes, and multiple MDF-CCCM prediction modes. The GLM prediction modes may further include multiple L-GLM prediction modes. The cross-component model modes in the method/process 400 may be identical to those in the method/process 300.

Referring back to FIG. 4, at block 450, the decoder module 124 may select one of the multiple CCP merge candidates for the block unit to determine a prediction model of the selected CCP merge candidate.

With reference to FIGS. 1 and 2, the decoder module 124 may determine the prediction model for the block unit based on the CCP merge candidates of the block unit in multiple determination schemes. When one of the CCP merge candidates is selected for the block unit, the CCP candidate model of a specific one of the CCP candidate blocks corresponding to the selected CCP merge candidate may also be determined from the CCP candidate models. Specifically, the specific CCP candidate block corresponding to the selected CCP merge candidate may be a reference block predicted and/or reconstructed based on the prediction model.

In some implementations, the decoder module 124 may determine a merge index from the bitstream. For example, the decoder module 124 may parse the merge index from the bitstream. The merge index may indicate one of the CCP merge candidates to determine the prediction model of the selected CCP merge candidate. Since each of the CCP candidate blocks corresponding to each of the CCP merge candidates has a corresponding one of the CCP candidate models, the selected CCP merge candidate may have a specific one of the CCP candidate models as the prediction model. Thus, the prediction model may be inherited from the specific CCP candidate model used to predict the reference block corresponding to the selected CCP merge candidate.

In some implementations, the decoder module 124 may determine the selected CCP merge candidate without parsing any index from the bitstream. For example, the decoder module 124 determine a first chroma template region of the block unit and determine a chroma reference region for each of the CCP candidate blocks. The decoder module 124 may then determine multiple template cost values by comparing each of the chroma reference regions of the CCP candidate blocks with the first chroma template region of the block unit. Thus, the decoder module 124 may determine the selected CCP merge candidate based on the template cost values, and further determine the CCP candidate model of the selected CCP merge candidate as the prediction model. It should be noted that the scheme for determining the selected CCP merge candidate may be changed without departing from the scope of the present disclosure. The size and the shape of the chroma reference regions of the CCP candidate blocks may be identical to those of the first chroma template region of the block unit.

Referring back to FIG. 4, at block 460, the decoder module 124 may predict the block unit using the prediction model of the selected CCP merge candidate to generate a first prediction block.

In some implementations, the block unit may inherit the prediction model of the reference block corresponding to the selected CCP merge candidate, which may result in the prediction model of the block unit being identical to the prediction model of the reference block. Thus, with reference to FIGS. 1 and 2, the decoder module 124 may predict the block unit using the prediction model of the block unit to generate the first prediction block.

The luma samples of the block unit may be reconstructed prior to reconstructing the chroma samples of the block unit. Thus, the decoder model 124 may determine the reconstructed luma samples of the block unit and predict the chroma samples of the block unit based on the reconstructed luma samples by the prediction model of the block unit to generate the first prediction block.

In some implementations, when the prediction model of the reference block does not include any of the multiple model refinement modes, the prediction model of the block unit may not include the model refinement modes. In some implementations, when the prediction model of the reference block includes one of the model refinement modes, the model refinement mode of the reference block may not be inherited by the block unit. Thus, the prediction model of the block unit may not include any of the model refinement modes. In some implementations, when the prediction model of the reference block includes one of the model refinement modes, the model refinement mode of the reference block may be inherited by the block unit. Thus, the prediction model of the block unit may also include the model refinement mode of the reference block. In some implementations, the bitstream may include a refinement inherited flag for determining whether the model refinement mode of the reference block is inherited by the block unit when the prediction model of the reference block includes one of the model refinement modes.

In some other implementations, the block unit may inherit the prediction model of the reference block, which may result in the prediction model of the reference block being the inherited model of the block unit. The inherited model of the block unit may be further refined based on one of the model refinement modes to generate the prediction model of the block unit. The decoder module 124 may then predict the block unit using the prediction model of the block unit to generate the prediction block. In yet other implementations, the inherited model of the block unit may include the model refinement mode of the reference block when the prediction model of the reference block includes one of the model refinement modes. In addition, the inherited model of the block unit may be further refined based on one of the model refinement modes to generate the prediction model of the block unit. In other words, the prediction model of the block unit may be generated by refining twice based on the model refinement modes.

The model refinement modes may include a CCP merge offset refinement mode, a CCP merge slope refinement mode, a CCP merge slope and offset refinement mode, and a CCP merge coefficient refinement mode. The model refinement modes in the method/process 400 may be identical to those in the method/process 300.

The prediction model of the reference block may include multiple model coefficients of the reference block. Since the inherited model of the block unit may be identical to the prediction model of the reference block, the inherited model of the block unit may also include the model coefficients of the reference block. In some implementations, when the inherited model of the block unit is not further refined, the prediction model of the block unit that is identical to the prediction model of the reference block may also include the model coefficients of the reference block. Thus, the decoder module 124 may predict the block unit using the prediction model of the reference block to generate the first prediction block based on the model coefficients of the reference block. In some implementations, when the inherited model of the block unit is further refined to generate the prediction model of the block unit, the prediction model of the block unit different from the prediction model of the reference block may be derived based on the model coefficients of the reference block. Thus, the decoder module 124 may predict the block unit using the prediction model of the block unit, which is derived based on the prediction model of the reference block, to generate the first prediction block based on the model coefficients of the block unit, which are derived based on the model coefficients of the reference block.

Referring back to FIG. 4, at block 470, the decoder module 124 may predict the block unit based on the intra prediction mode to generate a second prediction block.

With reference to FIGS. 1 and 2, in some implementations, the decoder module 124 may predict the block unit using the intra prediction mode of the block unit to generate the second prediction block. The second prediction block may be generated based on multiple reconstructed chroma samples adjacent to the block unit by using the intra prediction mode.

In some other implementations, the decoder module 124 may predict the block unit to generate the second prediction mode based on at least one chroma block vector.

In some implementations, one chroma block vector may be determined in a derived block vector mode. In other words, when the luma samples of the block unit are reconstructed based on a luma block vector, the luma block vector may be scaled based on a scaling factor to generate the chroma block vector. The scaling factor may be determined based on a video format. For example, if the video format is YUV422, the scaling factor may further include a width scaling factor equal to 2 and a height scaling factor equal to 1. The decoder module 124 may then determine a reconstructed chroma reference based on the chroma block vector as the second prediction block.

In some implementations, the at least one chroma block vector may be determined by using an intraTMP prediction mode. In other words, the decoder module 124 may determine a second chroma template region of the block unit, and may further search multiple chroma candidate blocks within a search range in the current frame. The decoder module 124 may further determine a chroma reference region for each of the chroma candidate blocks. The decoder module 124 may compare each of the chroma reference regions of the chroma candidate blocks with the second chroma template region of the block unit. The size and the shape of the chroma reference regions of the chroma candidate blocks may be identical to those of the second chroma template region of the block unit. In some implementations, the second chroma template region may be identical to the first chroma template region. In some other implementations, the second chroma template region may be different from the first chroma template region. The decoder module 124 may select at least one of the chroma candidate blocks based on the comparisons between each of the chroma reference regions and the second chroma template region. The decoder module 124 may then generate the second prediction block based on the at least one selected chroma candidate blocks. When the number of the at least one selected chroma candidate block is equal to one, the second prediction block may be identical to the selected chroma candidate block. When the number of the at least one selected chroma candidate block is greater than one, the selected chroma candidate blocks may be weighted combined to generate the second prediction block.

Referring back to FIG. 4, at block 480, the decoder module 124 may reconstruct the block unit based on the first prediction block and the second prediction block.

With reference to FIGS. 1 and 2, the decoder module 124 may weightedly combine the first prediction block and the second prediction block based on multiple weighting parameters to generate a predicted block. The weighting parameters may be derived based on multiple scheme. It should be noted that the derivation scheme of the weighting parameters may be changed without departing from the scope of the present disclosure. The decoder module 124 may determine the weighting parameters without parsing any index or flag from the bitstream.

In some implementations, the weighting parameters may be predefined. For examples, both of the two weighting parameters may be equal to 0.5. In some implementations, the weighting parameter of the first prediction block generated based on the CCP merge candidates may include a first predefined value greater than a second predefined value of the weighting parameter of the second prediction block. For example, the weighting parameter of the first prediction block may be equal to ⅔, and the weighting parameter of the second prediction block may be equal to ⅓. In some implementations, the weighting parameter of the first prediction block generated based on the CCP merge candidates may be the first predefined value which may be less than the second predefined value of the weighting parameter of the second prediction block.

In some implementations, the weighting parameters may be determined based on template cost values of the first prediction block and the second prediction block. The decoder module 124 may determine a third chroma template region and a luma template region of the block unit. The third chroma template region may neighbor a chroma block of the block unit, and the luma template region may neighbor a luma block of the block unit. The chroma block of the block unit may include the chroma samples of the block unit, and the luma block of the block unit may include the luma samples of the block unit. In some implementations, the third chroma template region may be identical to at least one of the first chroma template region and the second chroma template region. In some other implementations, the third chroma template region may be different from the first chroma template region and the second chroma template region. Since the third chroma template region and the luma template region reconstructed prior to reconstructing the block unit, the decoder module 124 may directly receive multiple reconstructed results of the third chroma template region and multiple reconstructed results of the luma template region. The decoder module 124 may generate multiple first predicted results of the third chroma template region based on the reconstructed results of the luma template region by using the prediction model of the block unit. The decoder module 124 may then generate a first template cost value TM1 of the first prediction block by comparing the first predicted results of the third chroma template region with the reconstructed results of the third chroma template region. In addition, the decoder module 124 may generate multiple second predicted results of the third chroma template based on multiple chroma reference samples neighboring the third chroma template by using the intra prediction mode. The decoder module 124 may then generate a second template cost value TM2 of the second prediction block by comparing the second predicted results of the third chroma template region with the reconstructed results of the third chroma template region. Thus, the weighting parameter of the first prediction block may be equal to TM2/(TM1+TM2), and the weighting parameter of the second prediction block may be equal to TM1/(TM1+TM2).

In some other implementations, the weighting parameters may be determined based on reconstructed modes of the neighboring blocks adjacent to the block unit. The neighboring blocks may include an above chroma block located above the block unit and a left chroma block located at a left side of the block unit. When both of the reconstructed modes of the above chroma block and the left chroma block are reconstructed using a corresponding one of the cross-component model modes, a ratio of the weighting parameter of the first prediction block to the weighting parameter of the second prediction block may be R:1. When both of the reconstructed modes of the above chroma block and the left chroma block are not reconstructed using the cross-component model modes, the ratio of the weighting parameter of the first prediction block to the weighting parameter of the second prediction block may be 1:R. In addition, when only one of the reconstructed modes of the above chroma block and the left chroma block is reconstructed using a corresponding one of the cross-component model modes, the ratio of the weighting parameter of the first prediction block to the weighting parameter of the second prediction block may be 1:1. In some implementations, the number R may be a positive integer, such as 3.

The decoder module 124 may reconstruct the block unit based on the predicted block. The decoder module 124 may determine multiple residual components from the bitstream for the block unit and add the residual components into the predicted block to reconstruct the block unit. The decoder module 124 may reconstruct all of the other block units in the image frame for reconstructing the image frame and the video. The method/process 400 may then end.

Figure 5:
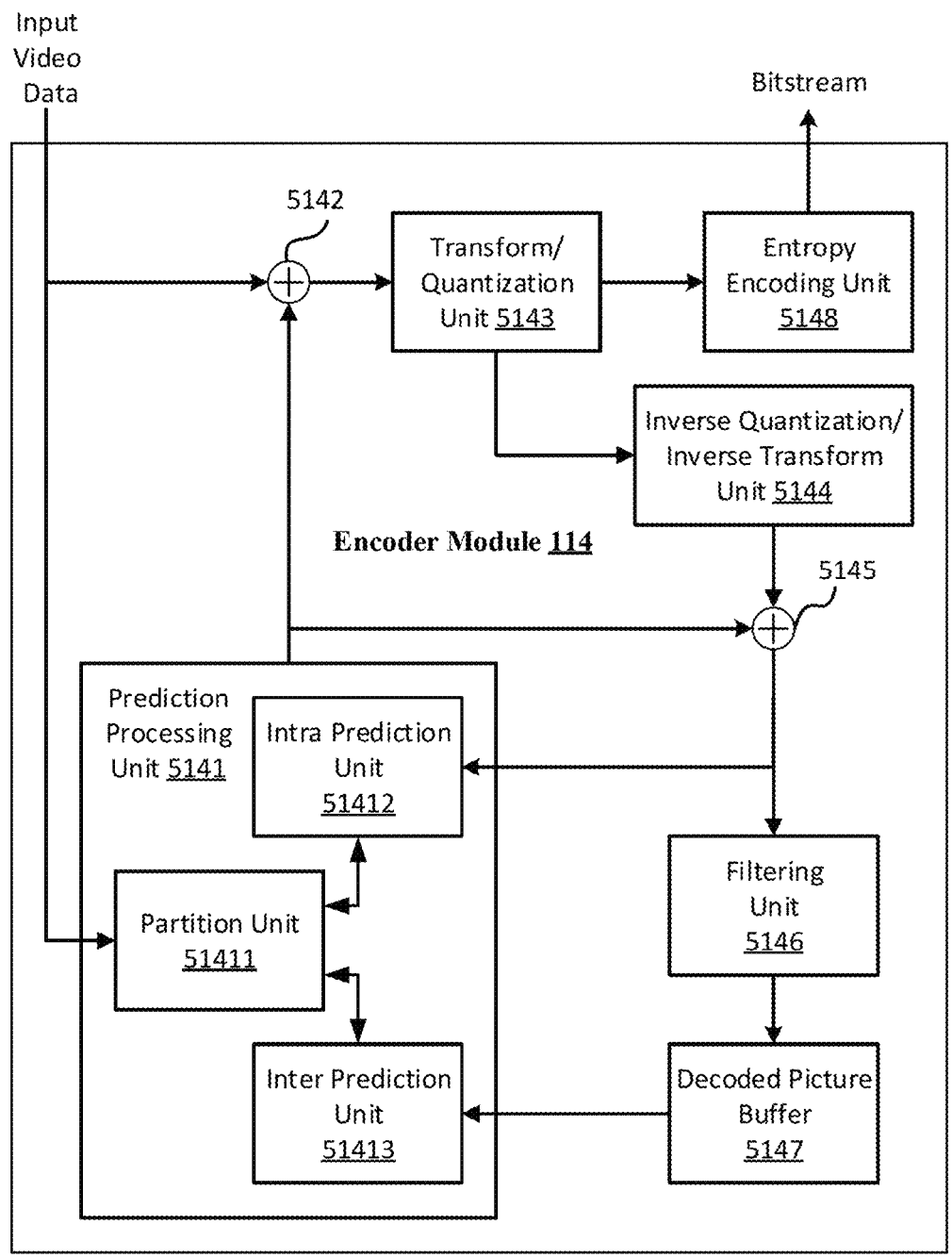
FIG. 5 is a block diagram illustrating an encoder module of the first electronic device illustrated in FIG. 1, in accordance with one or more example implementations of this disclosure.

FIG. 5 is a block diagram illustrating an encoder module 114 of the first electronic device 110 illustrated in FIG. 1, in accordance with one or more example implementations of this disclosure. The encoder module 114 may include a prediction processor (e.g., a prediction processing unit

5141), at least a first summer (e.g., a first summer 5142) and a second summer (e.g., a second summer 5145), a transform/quantization processor (e.g., a transform/quantization unit 5143), an inverse quantization/inverse transform processor (e.g., an inverse quantization/inverse transform unit 5144), a filter (e.g., a filtering unit 5146), a decoded picture buffer (e.g., a decoded picture buffer 5147), and an entropy encoder (e.g., an entropy encoding unit 5148). The prediction processing unit 5141 of the encoder module 114 may further include a partition processor (e.g., a partition unit 51411), an intra prediction processor (e.g., an intra prediction unit 51412), and an inter prediction processor (e.g., an inter prediction unit 51413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 5141 may receive a current image block of a specific one of the image frames. The current image block may be the luminance block or one of the chrominance blocks in the specific image frame.

The partition unit 51411 may divide the current image block into multiple block units. The intra prediction unit 51412 may perform intra-predictive coding of a current block unit relative to one or more neighboring blocks in the same frame as the current block unit in order to provide spatial prediction. The inter prediction unit 51413 may perform inter-predictive coding of the current block unit relative to one or more blocks in one or more reference image blocks to provide temporal prediction.

The prediction processing unit 5141 may select one of the coding results generated by the intra prediction unit 51412 and the inter prediction unit 51413 based on a mode selection method, such as a cost function. The mode selection method may be a rate-distortion optimization (RDO) process.

The prediction processing unit 5141 may determine the selected coding result and provide a predicted block corresponding to the selected coding result to the first summer 5142 for generating a residual block and to the second summer 5145 for reconstructing the encoded block unit. The prediction processing unit 5141 may further provide syntax elements, such as motion vectors, intra-mode indicators, partition information, and/or other syntax information, to the entropy encoding unit 5148.

The intra prediction unit 51412 may intra-predict the current block unit. The intra prediction unit 51412 may determine an intra prediction mode directed toward a reconstructed sample neighboring the current block unit in order to encode the current block unit.

The intra prediction unit 51412 may encode the current block unit using various intra prediction modes. The intra prediction unit 51412 of the prediction processing unit 5141 may select an appropriate intra prediction mode from the selected modes. The intra prediction unit 51412 may encode the current block unit using a cross-component prediction mode to predict one of the two chroma components of the current block unit based on the luma components of the current block unit. The intra prediction unit 51412 may predict a first one of the two chroma components of the current block unit based on the second of the two chroma components of the current block unit.

The inter prediction unit 51413 may inter-predict the current block unit as an alternative to the intra prediction performed by the intra prediction unit 51412. The inter prediction unit 51413 may perform motion estimation to estimate motion of the current block unit for generating a motion vector.

The motion vector may indicate a displacement of the current block unit within the current image block relative to a reference block unit within a reference image block. The inter prediction unit 51413 may receive at least one reference image block stored in the decoded picture buffer 5147 and estimate the motion based on the received reference image blocks to generate the motion vector.

The first summer 5142 may generate the residual block by subtracting the prediction block determined by the prediction processing unit 5141 from the original current block unit. The first summer 5142 may represent the component or components that perform this subtraction.

The transform/quantization unit 5143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 5143 may perform a scan of the matrix including the quantized transform coefficients. Alternatively, the entropy encoding unit 5148 may perform the scan.

The entropy encoding unit 5148 may receive multiple syntax elements from the prediction processing unit 5141 and the transform/quantization unit 5143, including a quantization parameter, transform data, motion vectors, intra modes, partition information, and/or other syntax information. The entropy encoding unit 5148 may encode the syntax elements into the bitstream.

The entropy encoding unit 5148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 5144 may apply inverse quantization and inverse transformation to reconstruct the residual block in the pixel domain for later use as a reference block. The second summer 5145 may add the reconstructed residual block to the prediction block provided by the prediction processing unit 5141 in order to produce a reconstructed block for storage in the decoded picture buffer 5147.

The filtering unit 5146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 5145.

The decoded picture buffer 5147 may be a reference picture memory that stores the reference block to be used by the encoder module 514 to encode video, such as in intra-coding or inter-coding modes. The decoded picture buffer 5147 may include a variety of memory devices, such as DRAM (e.g., including SDRAM), MRAM, RRAM, or other types of memory devices. The decoded picture buffer 5147 may be on-chip with other components of the encoder module 114 or off-chip relative to those components.

The method/process 300 for decoding and/or encoding video data may be performed by the first electronic device 110. With reference to FIGS. 1, 3, and 5, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 330, the encoder module 114 may determine multiple CCP merge candidates of the block unit selected from multiple CCP predefined candidates. The CCP merge candidates of the block unit is included in a CCP merge list of the block unit. The CCP merge candidates of the block unit determined by the encoder module 114 may be identical to the CCP merge candidates of the block unit determined by the decoder module 124. In addition, the CCP predefined candidates determined by the encoder module 114 may also be identical to the CCP predefined candidates determined by the decoder module 124.

At block 340, the encoder module 114 may select one of the multiple CCP merge candidates to determine a prediction model of the selected CCP merge candidate. In some implementations, the encoder module 114 may determines each of multiple CCP candidate blocks corresponding to each of the CCP merge candidates as one of multiple reference blocks. In other words, the encoder module 114 may predict the block unit by using each of the CCP merge candidates, and then select one of the CCP merge candidates based on multiple predicted results of the CCP merge candidates. In some other implementations, the encoder module 114 may determine only one reference block of the block unit predicted using the prediction model for determining the selected CCP merge candidate based on the template cost values. The template cost values may be generated by comparing each of multiple chroma reference regions of the CCP candidate blocks with a chroma template region of the block unit. Thus, the encoder module 114 may not encode any index into the bitstream for determining the selected CCP merge candidate of the block unit. The usage of the template cost values at block 340 by the encoder module 114 may be identical to that at block 340 by the decoder module 124.

At block 350, the encoder module 114 may predict the block unit using the prediction model of the selected CCP merge candidate to generate a prediction block.

In some implementations, the block unit may inherit the prediction model of a specific one of the reference blocks corresponding to the selected CCP merge candidate, when the encoder module 114 is predicting the block unit using the prediction model of the specific reference block. Thus, a specific one of multiple prediction models of the block unit may be identical to the prediction model of the specific reference block. Thus, the encoder module 114 may predict the block unit using the specific prediction model of the block unit to generate a specific one of multiple prediction blocks.

In some implementations, when the prediction model of the specific reference block does not include any of the model refinement modes, the specific prediction model of the block unit may not include the model refinement modes. In some implementations, when the prediction model of the specific reference block includes one of the model refinement modes, the model refinement mode of the specific reference block may not be inherited by the block unit. Thus, the specific prediction model of the block unit may not include any of the model refinement modes. In some implementations, when the prediction model of the specific reference block includes one of the model refinement modes, the model refinement mode of the specific reference block may be inherited by the block unit. Thus, the specific prediction model of the block unit may also include the model refinement mode of the specific reference block.

In some other implementations, the block unit may inherit the prediction model of the specific reference block, which may result in the prediction model of the specific reference block being a specific one of multiple inherited models of the block unit. The specific inherited model of the block unit may be further refined based on one of the model refinement modes to generate the specific prediction model of the block unit. The encoder module 114 may then predict the block unit using the specific prediction model of the block unit to generate the specific prediction block. In yet other implementations, the specific inherited model of the block unit may include the model refinement mode of the specific reference block when the prediction model of the specific reference block includes one of the model refinement modes. In addition, the specific inherited model of the block unit may be further refined based on one of the model refinement modes to generate the specific prediction model of the block unit. In other words, the specific prediction model of the block unit may be generated by refining twice based on the model refinement modes.

When each of the CCP merge candidates is used to predict the block unit, the encoder module 114 may generate the multiple prediction blocks based on the CCP merge candidates. Since the model refinement modes may be performed or may not be performed, the encoder module 114 may generate more than one prediction blocks for each of the CCP merge candidates. Thus, when the number of the CCP merge candidates is equal to Nc, the number of the prediction blocks may be much greater than Nc. In some implementations, the number Nc may be a positive integer, such as 6 or 12.

When only one of the CCP merge candidates selected based on the template cost values is used to predict the block unit, the encoder module 114 may generate the multiple prediction blocks based on the selected CCP merge candidate. Since the model refinement modes may be performed or may not be performed, the number of the prediction blocks may be much greater than one.

The model refinement modes performed by the encoder module 114 may be identical to the CCP predefined candidates performed by the decoder module 124. However, in some implementations, the encoder module 114 may perform each of the model refinement modes for each of the CCP merge candidates. In some implementations, a portion of the model refinement modes may be preset to be performed by the encoder module 114, and the others may be preset to be bypassed.

Referring back to FIG. 3, at block 360, the encoder module 114 may reconstruct the block unit based on the prediction block.

The encoder module 114 may predict the block unit based on other prediction modes to generate multiple predicted blocks. The encoder module 114 may select one of the prediction blocks and the predicted blocks based on a mode selection method, such as a cost function. The mode selection method may be a rate-distortion optimization (RDO) process. The encoder module 114 may provide the selected coding result to the first summer 5142 for generating a residual block and to the second summer 5145 for reconstructing the encoded block unit. The encoder module 114 may further provide syntax elements, such as a merge index and a refinement inherited flag, included in the bitstream for transmitting to the decoder module 124. The reconstruction of the block unit by the encoder module 114 may be identical to the reconstruction of the block unit by the decoder module 124. In some implementations, the merge index may be used for determining which one of the CCP merge candidates is selected based on the mode selection method. In some implementations, the refinement inherited flag may be used for determining whether the model refinement mode of the selected reference block corresponding to the selected CCP merge candidate is inherited by the block unit or not, when the prediction model of the selected reference block includes one of the model refinement modes. The method/process 300 for the encoder module 114 may then end.

The method/process 400 for decoding and/or encoding video data may be performed by the first electronic device 110. With reference to FIGS. 1, 4, and 5, at block 410, the method/process 400 may start by the encoder module 114 receiving the video data. The video data received by the encoder module 114 may be a video. At block 420, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 430, the encoder module 114 may determine an intra prediction mode from multiple intra default modes.

In some implementations, the encoder module 114 may determines each of intra default modes as one of multiple intra prediction modes. In other words, the encoder module 114 may predict the block unit by using each of the intra default modes, and then select one of the intra default modes based on multiple predicted results of the intra default modes. In some other implementations, the encoder module 114 may determine the predefined one of the Planar mode, the DC mode, and the intra angular modes. For example, the predefined one of the intra default modes may be the Planar mode. In yet other implementations, the intra prediction mode may be selected from the intra angular modes of the intra default modes by using a DIMD mode. The intra prediction mode selected using the DIMD mode may be derived by calculating a histogram of gradient based on multiple chroma samples neighboring the block unit and multiple luma samples neighboring a corresponding luma block.

At block 440, the encoder module 114 may determine a cross-component prediction (CCP) merge list of the block unit including multiple CCP merge candidates. The encoder module 114 may determines multiple CCP merge candidates of the block unit selected from multiple CCP predefined candidates. The CCP merge candidates of the block unit determined by the encoder module 114 may be identical to the CCP merge candidates of the block unit determined by the decoder module 124. In addition, the CCP predefined candidates determined by the encoder module 114 may also be identical to the CCP predefined candidates determined by the decoder module 124.

At block 450, the encoder module 114 may select one of the multiple CCP merge candidates for the block unit to determine a prediction model of the selected CCP merge candidate. The encoder module 114 may determine the prediction model for the block unit based on the CCP merge candidates. In some implementations, the encoder module 114 may determines each of multiple CCP candidate blocks corresponding to each of the CCP merge candidates as one of multiple reference blocks. In other words, the encoder module 114 may predict the block unit by using each of the CCP merge candidates, and then select one of the CCP merge candidates based on multiple predicted results of the CCP merge candidates. In some other implementations, the encoder module 114 may determine only one reference block of the block unit predicted using the prediction model for determining the selected CCP merge candidate based on the template cost values. The template cost values may be generated by comparing each of multiple chroma reference regions of the CCP candidate blocks with a chroma template region of the block unit. Thus, the encoder module 114 may not encode any index into the bitstream for determining the selected CCP merge candidate of the block unit. The usage of the template cost values at block 340 by the encoder module 114 may be identical to that by the decoder module 124.

At block 460, the encoder module 114 may predict the block unit using the prediction model of the selected CCP merge candidate to generate a first prediction block. Multiple first prediction blocks generated based on the multiple CCP merge candidates at block 450 by the encoder module 114 may be identical to the multiple prediction blocks generated based on the multiple CCP merge candidates at block 350 by the encoder module 114.

At block 470, the encoder module 114 may predict the block unit based on the intra prediction mode to generate a second prediction block.

When each of the intra default modes is used to predict the block unit, the encoder module 114 may generate multiple second prediction blocks based on the intra default modes. When the intra prediction mode is the predefined intra default mode, the encoder module 114 may generate one second prediction block based on the predefined intra default mode. When the intra prediction mode is selected using the DIMD mode, the encoder module 114 may generate one second prediction block based on the intra prediction mode selected using the DIMD mode.

At block 480, the encoder module 114 may reconstruct the block unit based on the first prediction block and the second prediction block.

The encoder module 114 may weightedly combine one of the first prediction blocks and one of the second prediction blocks based on multiple weighting parameters to generate one of multiple first predicted blocks. The weighting parameters derived by the encoder module 114 may be identical to the weighting parameters derived by the decoder module 124. When the number of first prediction blocks is equal to N1 and the number of the second prediction blocks is equal to N2, the number of the first predicted blocks may be equal to N1×N2.

The encoder module 114 may predict the block unit based on other prediction modes to generate multiple second predicted blocks. The encoder module 114 may select one of the first predicted blocks and the second predicted blocks based on a mode selection method, such as a cost function. The mode selection method may be an RDO process. The encoder module 114 may provide the selected coding result to the first summer 5142 for generating a residual block and to the second summer 5145 for reconstructing the encoded block unit. The encoder module 114 may further provide syntax elements, such as a merge index, a refinement inherited flag, and an intra mode index, included in the bitstream for transmitting to the decoder module 124. The reconstruction of the block unit by the encoder module 114 may be identical to the reconstruction of the block unit by the decoder module 124. In some implementations, the merge index may be used for determining which one of the CCP merge candidates is selected based on the mode selection method. In some implementations, the refinement inherited flag may be used for determining whether the model refinement mode of the selected reference block corresponding to the selected CCP merge candidate is inherited by the block unit or not, when the prediction model of the selected reference block includes one of the model refinement modes. In some implementations, the intra mode index is used for determining which one of the intra default modes is selected based on the mode selection method. The method/process 400 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:
   receiving the video data;
   determining a block unit from a current frame included in the video data;
   determining an intra prediction mode from a plurality of intra default modes;
   determining a cross-component prediction (CCP) merge list of the block unit including a plurality of CCP merge candidates;
   selecting one of the plurality of CCP merge candidates for the block unit to determine a prediction model of the selected one of the plurality of CCP merge candidates;
   predicting the block unit using the prediction model of the selected one of the plurality of CCP merge candidates to generate a first prediction block;
   predicting the block unit based on the intra prediction mode to generate a second prediction block; and
   reconstructing the block unit based on the first prediction block and the second prediction block.

2. The method according to claim 1, further comprising:
   weightedly combining the first prediction block and the second prediction block to generate a predicted block, wherein reconstructing the block unit is further based on the predicted block.

3. The method according to claim 1, wherein:
   each of the plurality of CCP merge candidates of the block unit has a candidate model, and
   the candidate model of the selected one of the plurality of CCP merge candidates is the prediction model used for predicting the block unit to generate the first prediction block.

4. The method according to claim 1, wherein:
   the plurality of CCP merge candidates of the block unit is selected from a plurality of CCP predefined candidates including a plurality of block-vector-based CCP merge candidates.

5. The method according to claim 1, wherein:
   the plurality of CCP merge candidates of the block unit is selected from a plurality of CCP predefined candidates, and
   the plurality of CCP predefined candidates includes at least one of a plurality of spatial adjacent CCP merge candidates, a plurality of spatial non-adjacent CCP merge candidates, a plurality of history-based CCP merge candidates, a plurality of default CCP merge candidates, or a plurality of temporal CCP merge candidates.

6. The method according to claim 1, wherein:
   the prediction model of the selected one of the plurality of CCP merge candidates includes a plurality of model coefficients used for predicting a reference block corresponding to the selected one of the plurality of CCP merge candidates, and
   predicting the block unit using the prediction model of the selected one of the plurality of CCP merge candidates to generate the first prediction block is further based on the plurality of model coefficients.

7. The method according to claim 1, wherein:
   the plurality of intra default modes includes a Planar mode, a DC mode, and a plurality of intra angular modes.

8. The method according to claim 7, wherein:
   the intra prediction mode of the block unit is a predefined one of the Planar mode, the DC mode, and the plurality of intra angular modes.

9. The method according to claim 7, wherein:
   determining the intra prediction mode of the block unit from the plurality of intra angular modes is based on a decoder-side intra mode derivation (DIMD) mode.

10. An electronic device for decoding video data, the electronic device comprising:
    one or more processors; and
    one or more non-transitory computer-readable media coupled to the one or more processors and storing one or more computer-executable instructions that, when executed by at least one of the one or more processors, cause the electronic device to:
    receive the video data;
    determine a block unit from a current frame included in the video data;
    determine an intra prediction mode from a plurality of intra default modes;
    determine a cross-component prediction (CCP) merge list of the block unit including a plurality of CCP merge candidates;
    selecting one of the plurality of CCP merge candidates for the block unit to determine a prediction model of the selected one of the plurality of CCP merge candidate;

predict the block unit using the prediction model of the selected one of the plurality of CCP merge candidates to generate a first prediction block;

predict the block unit based on the intra prediction mode to generate a second prediction block; and reconstruct the block unit based on the first prediction block and the second prediction block.

11. The electronic device according to claim 10, wherein the one or more computer-executable instructions, when executed by the at least one of the one or more processors, further cause the electronic device to:

weightedly combining the first prediction block and the second prediction block to generate a predicted block, wherein reconstructing the block unit is further based on the predicted block.

12. The electronic device according to claim 10, wherein:

each of the plurality of CCP merge candidates of the block unit has a candidate model, and the candidate model of the selected one of the plurality of CCP merge candidates is the prediction model used for predicting the block unit to generate the first prediction block.

13. The electronic device according to claim 10, wherein:

the plurality of CCP merge candidates of the block unit is selected from a plurality of CCP predefined candidates including a plurality of block-vector-based CCP merge candidates.

14. The electronic device according to claim 10, wherein:

the plurality of CCP merge candidates of the block unit is selected from a plurality of CCP predefined candidates, and the plurality of CCP predefined candidates includes at least one of a plurality of spatial adjacent CCP merge candidates, a plurality of spatial non-adjacent CCP merge candidates, a plurality of history-based CCP merge candidates, a plurality of default CCP merge candidates, or a plurality of temporal CCP merge candidates.

15. The electronic device according to claim 10, wherein:

the prediction model of the selected one of the plurality of CCP merge candidates includes a plurality of model coefficients used for predicting a reference block corresponding to the selected one of the plurality of CCP merge candidates, and predicting the block unit using the prediction model of the selected one of the plurality of CCP merge candidates to generate the first prediction block is further based on the plurality of model coefficients.

16. The electronic device according to claim 10, wherein:

the plurality of intra default modes includes a Planar mode, a DC mode, and a plurality of intra angular modes.

17. The electronic device according to claim 16, wherein:

the intra prediction mode of the block unit is a predefined one of the Planar mode, the DC mode, and the plurality of intra angular modes.

18. The electronic device according to claim 16, wherein:

determining the intra prediction mode of the block unit from the plurality of intra angular modes is based on a decoder-side intra mode derivation (DIMD) mode.

* * * * *